US00RE47386E

(19) United States
(12) Reissued Patent
Gilock et al.

(10) Patent Number: US RE47,386 E
(45) Date of Reissued Patent: May 14, 2019

(54) MICROWAVE OVEN

(71) Applicant: Samsung Electronics Co., Ltd., Suwon-si, Gyeonggi-do (KR)

(72) Inventors: Lee Gilock, Seoul (KR); Kwack Jung Kyung, Seoul (KR)

(73) Assignee: Samsung Electronics Co., Ltd., Gyeonggi-do (KR)

(21) Appl. No.: 29/528,925

(22) Filed: Jun. 2, 2015

Related U.S. Patent Documents

Reissue of:
(64) Patent No.: Des. 683,576
Issued: Jun. 4, 2013
Appl. No.: 29/374,742
Filed: Sep. 29, 2011

(30) Foreign Application Priority Data

Sep. 22, 2011 (KR) ..... 30-2011-0039265

(51) LOC (11) Cl. ..... 07-02
(52) U.S. Cl.
USPC ..... D7/351
(58) Field of Classification Search
USPC ..... D7/349, 350.1, 350.3, 351, 402, 405
(Continued)

(56) References Cited

U.S. PATENT DOCUMENTS

D63,212 S * 11/1923 Baylis ..... D6/603
D518,680 S * 4/2006 Kim ..... D7/351
(Continued)

OTHER PUBLICATIONS

Notice of Allowance dated May 5, 2017 for co-pending U.S. Appl. No. 29/565,903.

*Primary Examiner* — Philip S Hyder
(74) *Attorney, Agent, or Firm* — Harness, Dickey & Pierce, P.L.C.

(57) CLAIM

We claim the ornamental design for a microwave oven, as shown and described.

DESCRIPTION

*More than one reissue application has been filed for U.S. Design Pat. No. D683,576. The reissue applications are divisional reissue application Ser. No. 29/565,903 and the present reissue application Ser. No. 29/528,925, all of which are reissues of U.S. Design Pat. No. D683,576.*

Figure 1:
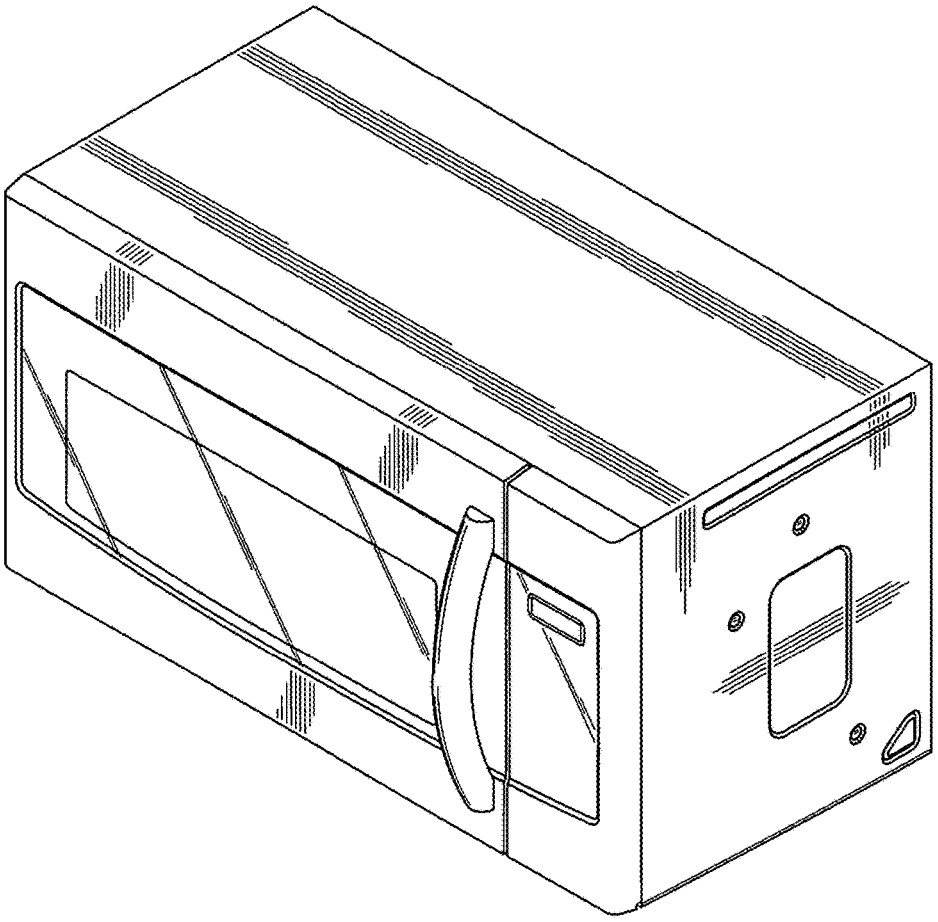
Figure 2:
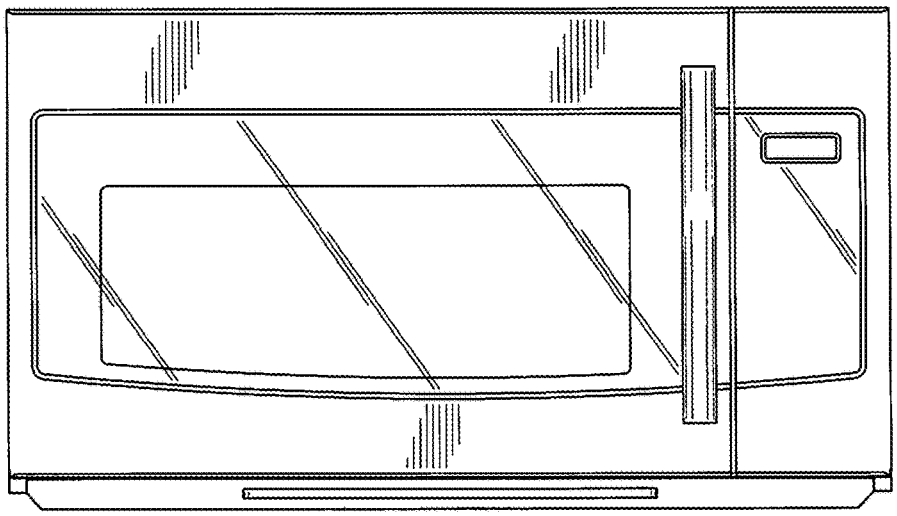
Figure 3:
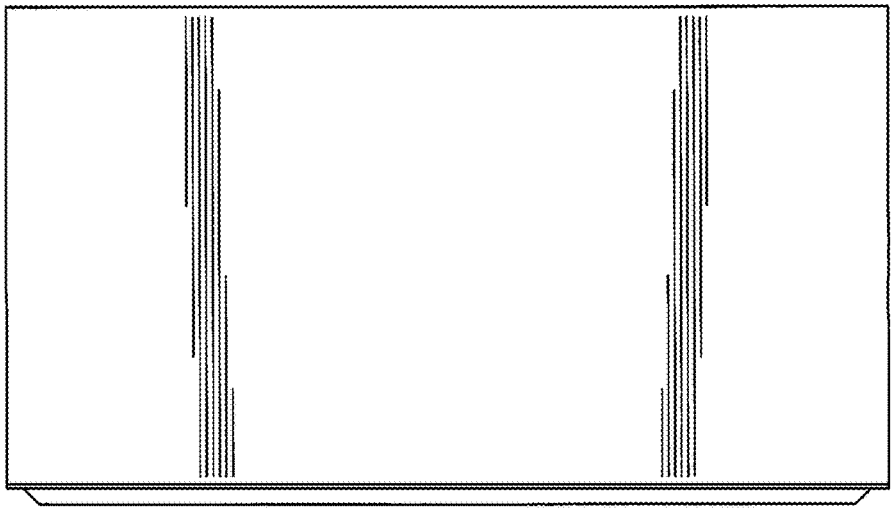
Figure 4:
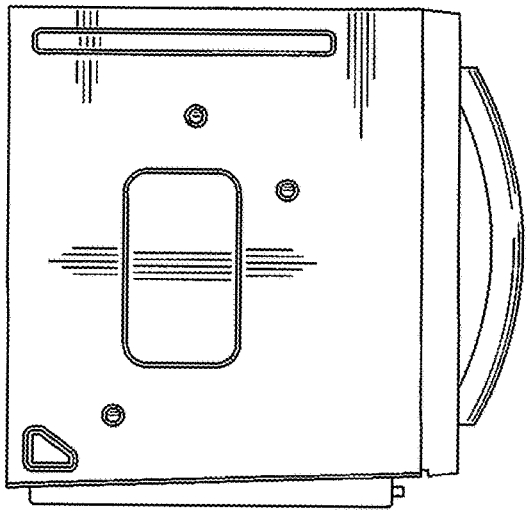
Figure 5:
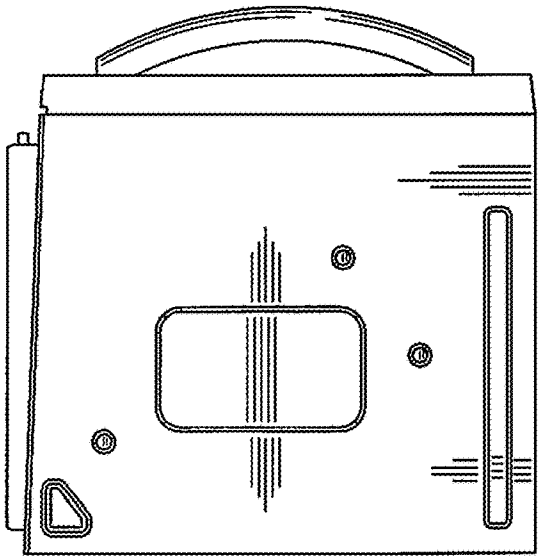
Figure 6:
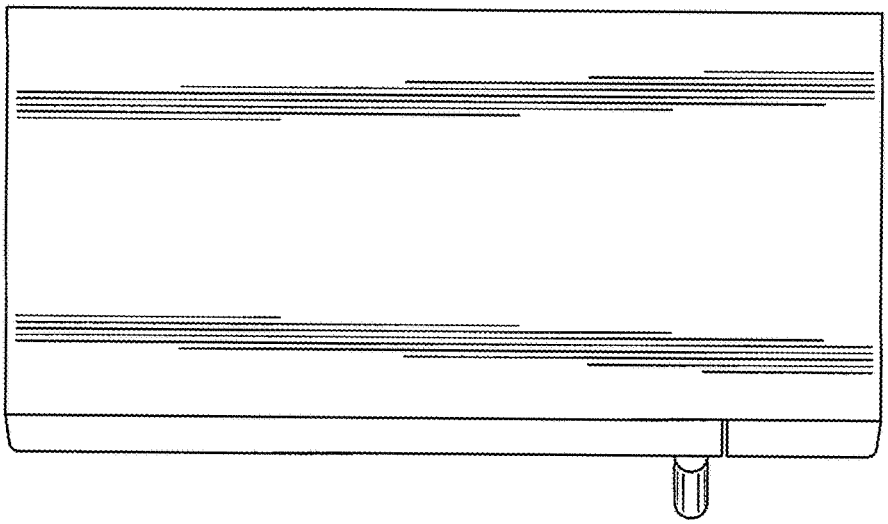
Figure 7:
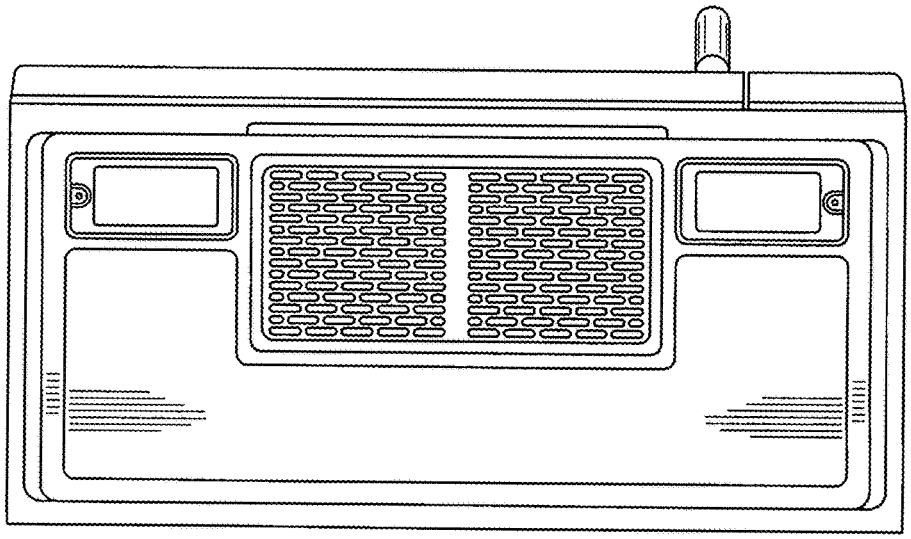
Figure 8:
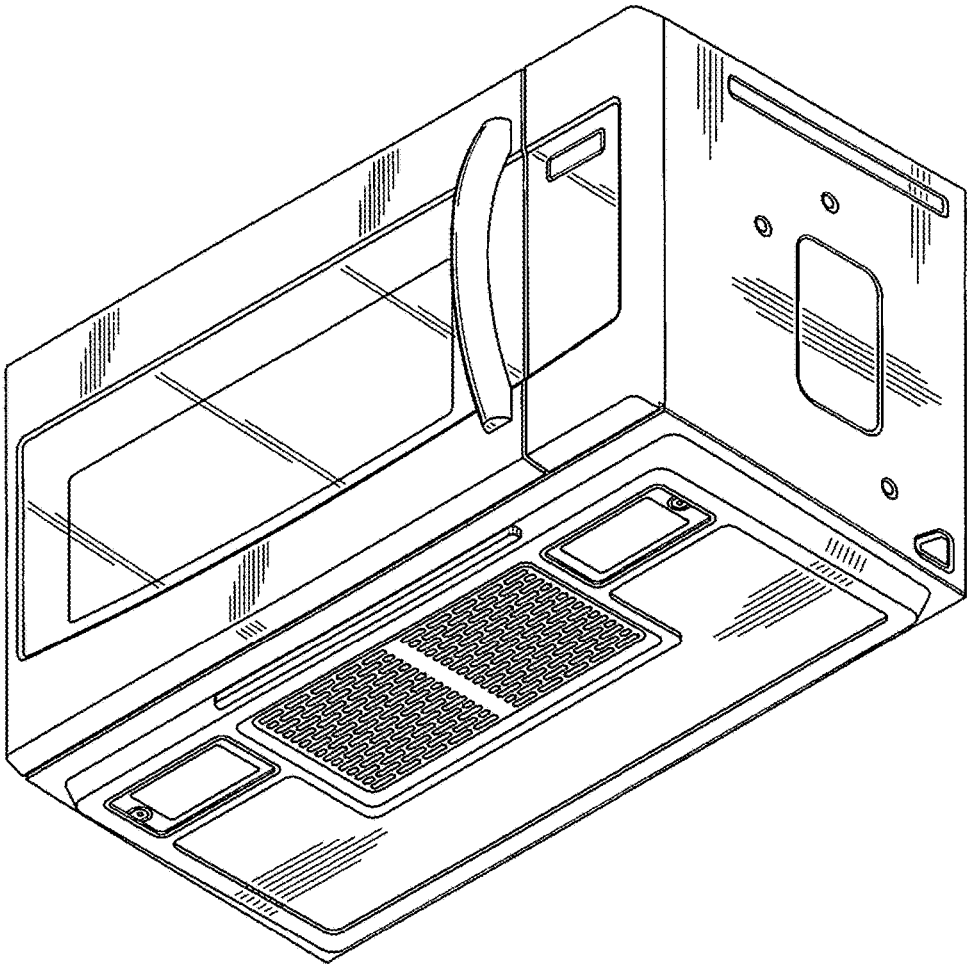
Figure 9:
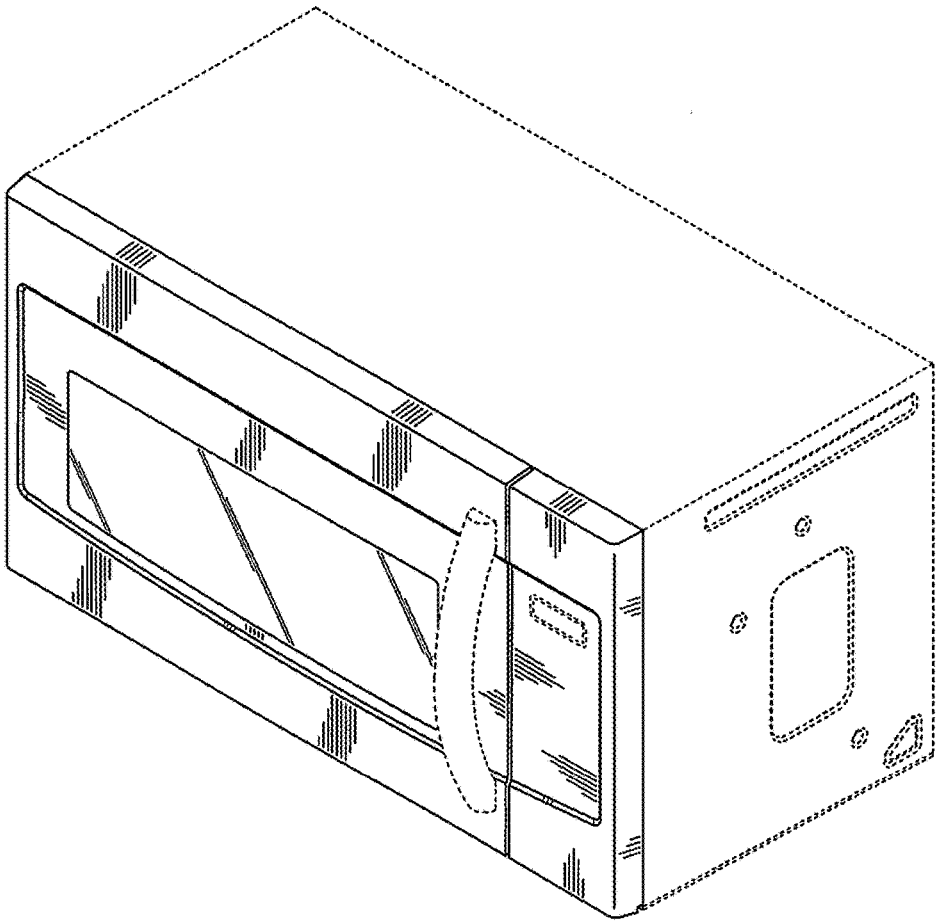
Figure 10:
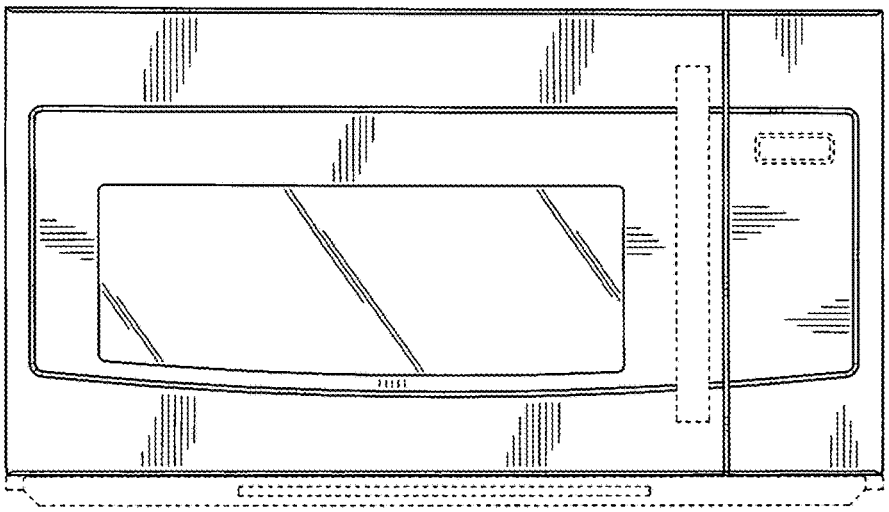
Figure 11:
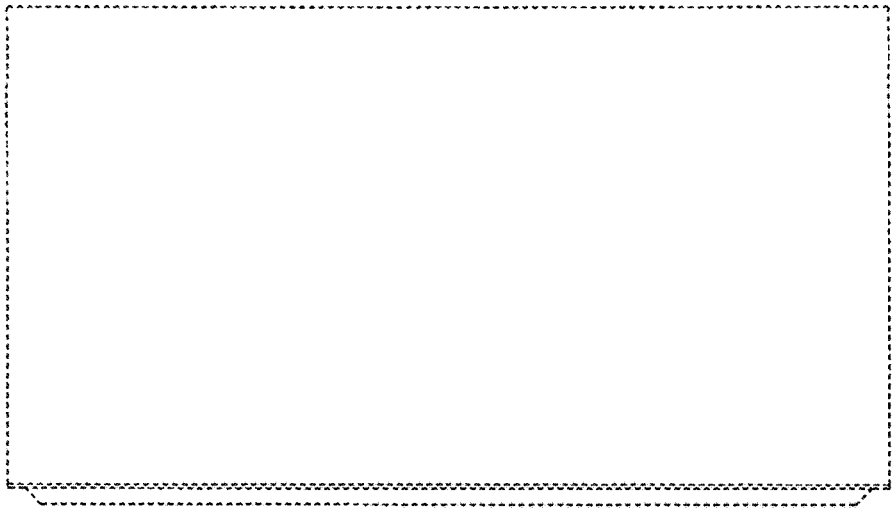
Figure 12:
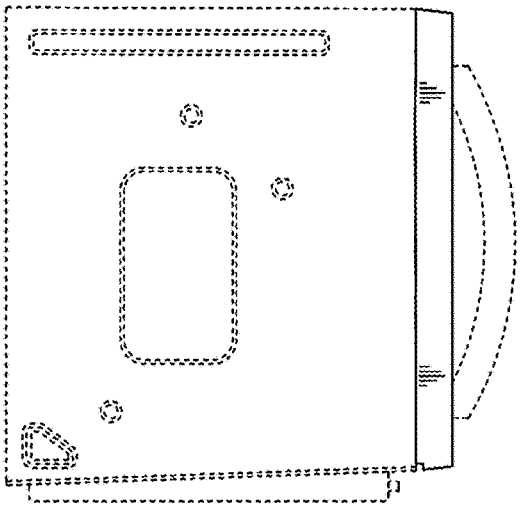
Figure 13:
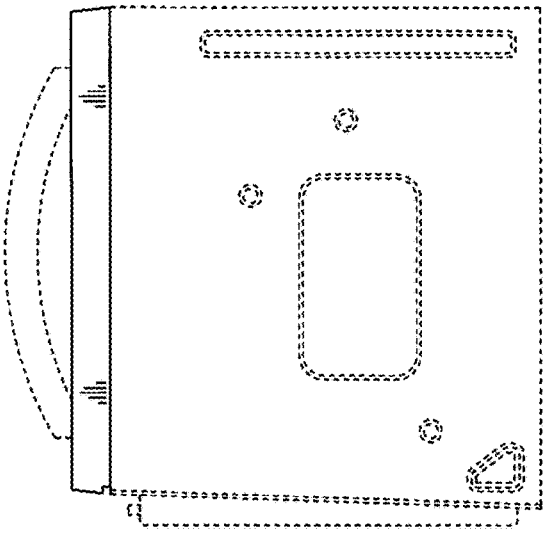
Figure 14:
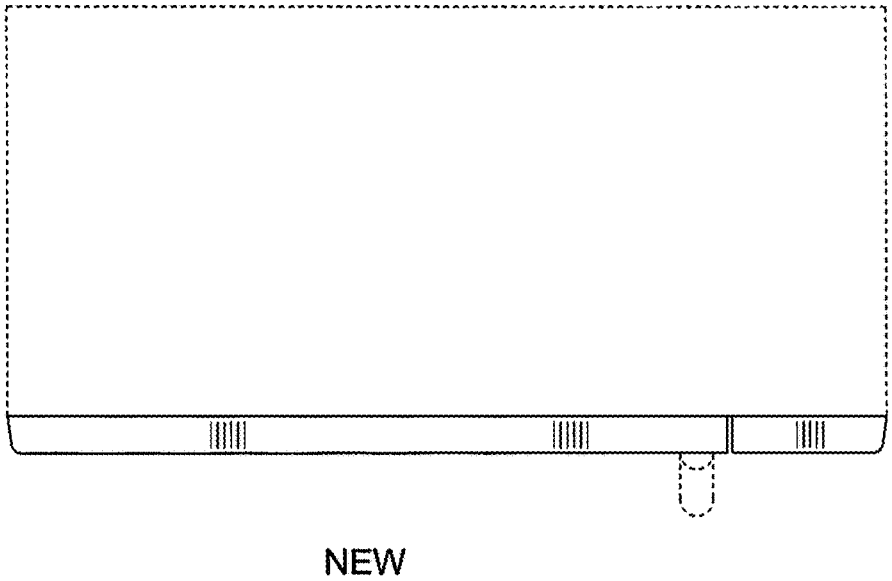
Figure 15:
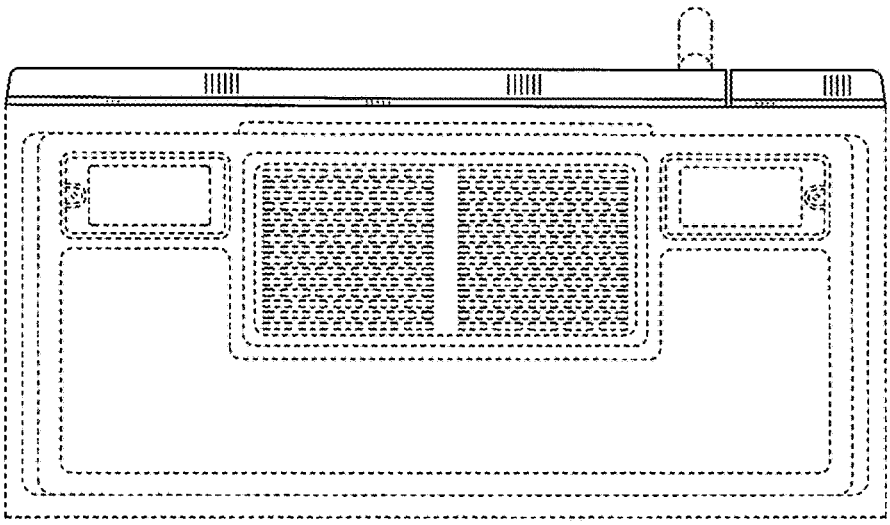
Figure 16:
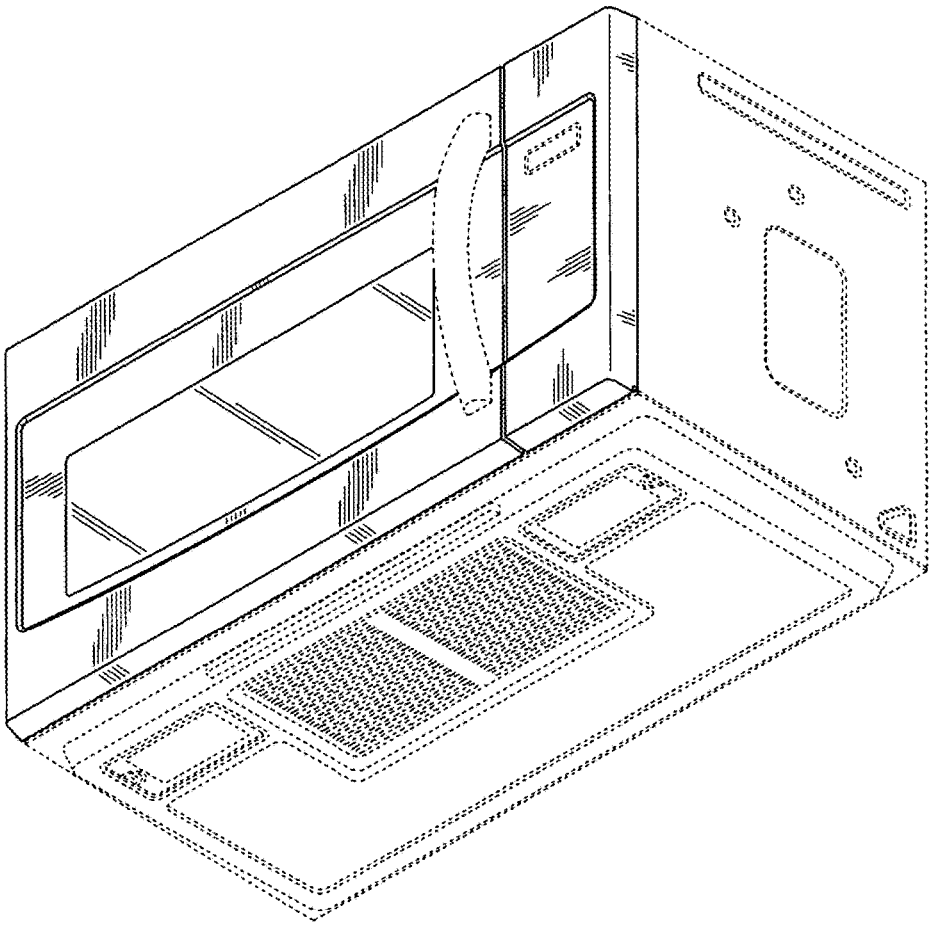

FIG. 1 is a top, front and right [side] perspective view of a microwave oven showing our new design;
FIG. 2 is a front elevational view thereof;
FIG. 3 is a rear elevational view thereof;
FIG. 4 is a left side elevational view thereof;
FIG. 5 is a right side elevational view thereof;
FIG. 6 is a top plan view thereof;
FIG. 7 is a bottom plan view thereof; [and,]
FIG. 8 is a bottom, front, and right side perspective view thereof[.]*;*
*FIG. 9 is a perspective of a second embodiment of the microwave oven, showing our new design;*
*FIG. 10 is a front elevational view thereof;*
*FIG. 11 is a rear elevational view thereof;*
*FIG. 12 is a left side elevational view thereof;*
*FIG. 13 is a right side elevational view thereof;*
*FIG. 14 is a top plan view thereof;*
*FIG. 15 is a bottom plan view thereof; and,*
*FIG. 16 is a bottom, front, and right perspective view thereof.*
*The broken lines depict portions of the microwave oven in which the design is embodied that are not considered part of the claimed design.*

1 Claim, 16 Drawing Sheets

Matter enclosed in heavy brackets [ ] appears in the original patent but forms no part of this reissue; matter printed in italics indicates the additions made by reissue.

(58) Field of Classification Search
CPC ..... H05B 6/64; H05B 6/6417; H05B 6/6414
See application file for complete search history.

(56) References Cited

U.S. PATENT DOCUMENTS

| | | | | | |
|---|---|---|---|---|---|
| D532,645 | S | * | 11/2006 | Lee | D7/351 |
| D561,529 | S | * | 2/2008 | Suh | D7/351 |
| D576,834 | S | * | 9/2008 | Shin et al. | D7/351 |
| D576,835 | S | * | 9/2008 | Shin | D7/351 |
| D583,614 | S | * | 12/2008 | Chung et al. | D7/351 |
| D607,264 | S | * | 1/2010 | Lee | D7/351 |
| D631,388 | S | * | 1/2011 | Itzkowitz | D11/90 |
| D631,688 | S | * | 2/2011 | Kim et al. | D7/351 |
| D631,689 | S | | 2/2011 | Kim et al. | |
| D632,125 | S | * | 2/2011 | Kim | D7/351 |
| D633,328 | S | * | 3/2011 | Shin | D7/351 |
| D633,750 | S | * | 3/2011 | Baek et al. | D7/351 |
| D633,751 | S | * | 3/2011 | Baek et al. | D7/351 |
| D634,576 | S | * | 3/2011 | Baek et al. | D7/351 |
| D653,908 | S | * | 2/2012 | Browne | D7/405 |
| D673,416 | S | * | 1/2013 | Lee | D7/351 |
| D673,417 | S | * | 1/2013 | Lee | D7/351 |
| D673,805 | S | * | 1/2013 | Lee | D7/351 |

* cited by examiner

NEW

NEW

NEW

NEW

NEW

NEW

NEW